United States Patent [19]
Magee et al.

[11] Patent Number: 4,909,625
[45] Date of Patent: Mar. 20, 1990

[54] METHOD AND APPARATUS FOR GENERATING SMALL ANGLES

[75] Inventors: Robert J. Magee, Concord; Jian P. Marchi, Littleton; Daniel F. Sullivan, Randolph, all of Mass.; Gary L. Brown, Sandy, Utah

[73] Assignee: The United States of America as represented by the Secretary of the Navy, Washington, D.C.

[21] Appl. No.: 215,200

[22] Filed: Jul. 5, 1988

[51] Int. Cl.⁴ .............................................. G01B 11/26
[52] U.S. Cl. .................................................... 356/138
[58] Field of Search ........................................ 356/138

[56] References Cited

U.S. PATENT DOCUMENTS 3,904,295 9/1975 Hock et al. .......................... 356/398
3,958,884 5/1976 Smith .................................. 356/360

Primary Examiner—Leon Scott, Jr.
Attorney, Agent, or Firm—Prithvi C. Lall; Michael J. McGowan

[57] ABSTRACT

A method and apparatus for generating small angles for calibrating autocollimators or the like is described. It includes a small angle wedge which is rigidly attached to a mechanical beam which is rotatable about a pivot point. The rotation of wedge causes a very small deviation in the line of sight of an autocollimator under test after passing through the wedge and thus gives a large optical advantage.

8 Claims, 1 Drawing Sheet

U.S. Patent
Mar. 20, 1990
4,909,625
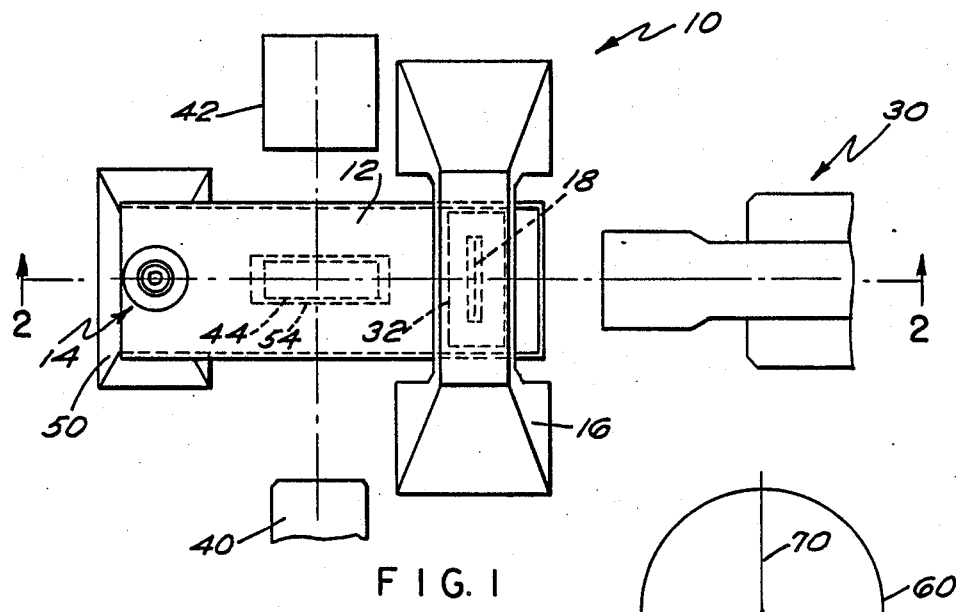
FIG. 1
FIG. 4
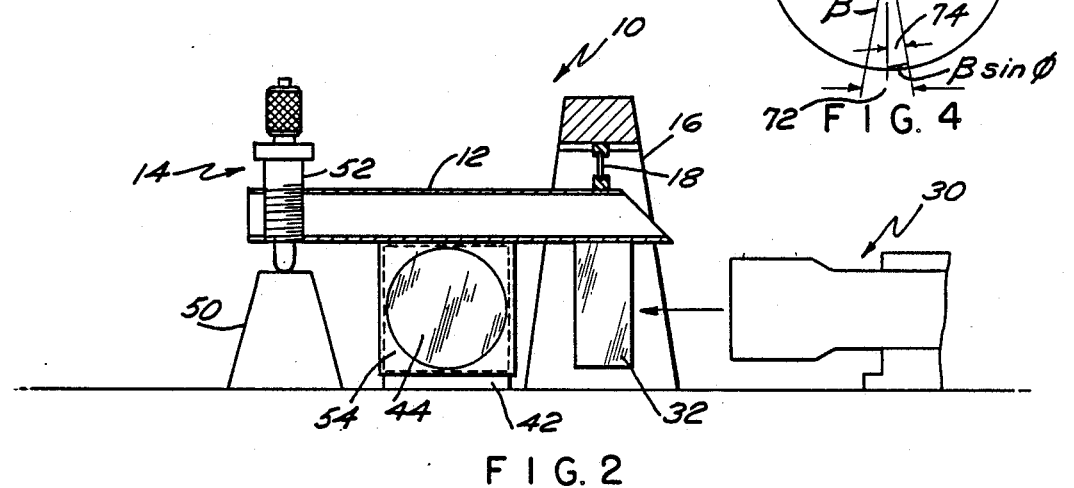
FIG. 2
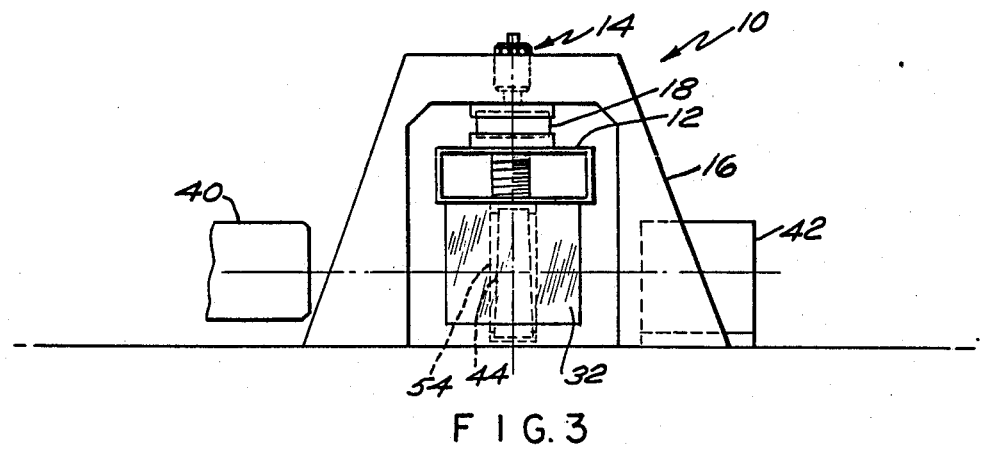
FIG. 3

METHOD AND APPARATUS FOR GENERATING SMALL ANGLES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

Subject invention is related to a small angle generating apparatus and more particularly to generate small measurable angular deviations of a collimated light beam for purposes of calibrating an autocollimator.

(2) Description of the Prior Art

The angular deflections of light rays have been accomplished in the past by converting large mechanical movements into corresponding small movements of reflecting or refracting surfaces. Such methods are expensive due to the required accuracy and repeatability of the moving parts. Besides, some of the mechanical movements used are nonlinear which render such devices hard to calibrate. Some of the prior art devices have used either spur gears or worm gears, both of which lack the desired accuracy. It is thus desirable to have a small angle generating apparatus which is accurate with repeatable results and is not expensive.

SUMMARY OF THE INVENTION

A small angle generator according to the teachings of subject invention includes a rigid mechanical beam having an optical wedge with a small apex angle attached thereto in a way that the line of sight from a test autocollimator passes through the wedge with its apex angle nominally vertical when angular changes are desired in azimuth. The mechanical beam is pivotable about a flexure pivot provided on its one end by means of a micrometer at the opposite end. A flat mirror is attached near the end of the beam with the flexure pivot. The mirror rotates with the wedge and the mechanical beam and is a part of an autocollimator which monitors the wedge orientation accurately. The motion of the wedge is effectuated by the micrometer which in turn generates a much smaller angular motion for the line of sight of a test autocollimator which passes through the wedge.

An object of subject invention is to generate small angles.

Another object of subject invention is to generate small angular deviations in a collimated beam of light for testing autocollimators or the like.

Still another object of subject invention is to use an optically stiff mechanical beam for the motion of an optical wedge.

An additional object of subject invention is to use optical surfaces which are relatively flat.

Other objects, advantages and novel features of the invention may become apparent from the following detailed description of the invention when considered in conjunction with the accompanying drawings wherein:

BRIEF DESCRIPTION OF THE DRAWINGS

FIG. 1 is a top view of a small angle generating apparatus according to the teachings of subject invention;

FIG. 2 is a cross-section of the apparatus of FIG. 1 along line 2—2 thereof;

FIG. 3 is a side view of the apparatus of FIG. 1; and

FIG. 4 is a plot of the deviation angle for the line of sight.

DESCRIPTION OF A PREFERRED EMBODIMENT

Referring now to the drawings wherein like numbers correspond to the like parts throughout, FIG. 1 shows a top view of a small angle generator 10 according to the teachings of subject invention. It includes an optically stiff mechanical beam 12 having a micrometer 14 mounted at one end and attached to a rigid support 16 by means of a flexure pivot 18 enabling the beam to rotate counterclockwise or clockwise about a horizontal axis passing through pivot 18. An autocollimator 30 is used to measure accurately the rotation of the beam 12 and a flat mirror 32 is attached to beam 12 as shown in FIGS. 1 and 2. Flat mirror 32 is generally perpendicular to light coming from the autocollimator 30. A thin wedge 44, mounted in housing 54 is also secured to the beam 12 as shown in FIGS. 1 and 2 so that the rotational motion of the beam is transferred linearly to mirror 32 and wedge 44. Shaft 52 of micrometer 14 is coupled to beam 12 at the end opposite to the end with the flexure pivot 18 and is used together with support 50 to impart rotational motion to beam 12. A dynamic autocollimator (DYNAC) 40 including a light beam reflector 42 and the light beam generator and detector 44 as shown in FIGS. 1–3 is provided for calibration purposes using the small angles generated to deviate the line of sight passing through wedge 44.

In operation, micrometer 14 is adjusted so that the beam 12 is horizontal with the mirror 32 and wedge 44 in their respective positions. Line of sight of autocollimator 30 is observed in conjunction with mirror 32. Line of sight for the test autocollimator (DYNAC) 40 passes through the wedge 44 and is reflected by its corresponding reflecting mirror 42. Wedge 44 is mounted in housing 54 so that its narrow end is at the top and its wide end is at the bottom. The light beam from the DYNAC 40 due to refraction through wedge 44 experiences an angular deviation of angle $\beta$ which is approximately half the apex angle $\alpha$ of the wedge which is preferably made of a material of refractive index 1.5. The angular deflections are assumed to be small enough that the sine of the angles can be approximated to their respective values in radians. The light beam from the collimator after passing through the center of wedge 44 thus experiences a deviation $\beta = (\frac{1}{2})\alpha$ in the downward direction when the mechanical beam 12 is in the horizontal position. Beam 12 is then rotated counterclockwise through angle $\phi$ by adjusting the position of micrometer 14. Mirror 32 and wedge 44 experience rotation through angle $\phi$ as they are attached to the beam 12. As a result of counterclockwise rotation of wedge 44 through $\phi$, the faces of the wedge through which the light beam enters and leaves the wedge tilt slightly to the right (horizontally) in addition to their downward (vertically) translational motion. Angle $\phi$ through which the beam 12 and the attached mirror 32 and wedge 44 are moved in counterclockwise direction is measured accurately by autocollimator 32 due to change in its line of sight. The light beam for the test autocollimator also experiences a deviation of $\beta$ (or $\alpha/2$) in the downward direction due to refractions at the two faces of wedge 44. The light beam also experiences a slight deviation to the right horizontally due to the tilting of the faces thereof. This is shown in FIG. 4 where radius 70 of circle 60 represents the deviation of the light beam for the test autocollimator when the mechanical beam 12 is in horizontal position. As pointed out earlier, angle $\beta$ is equal to half the apex angle $\alpha$ of wedge 44. As shown in FIG. 4, the horizontal component of the deviation due to the tilting of faces of wedge 44 resulting from the counterclockwise angular motion by angle $\phi$ of the mechanical beam is given by $\beta \sin \phi$ as shown in FIG. 4. Thus, the optical advantage which is defined as the ratio of horizontal deviation of the line of sight for the test autocollimator (DYNAC) to angle of rotation of the beam is given by $$\frac{\beta \sin \phi}{\phi}$$

or $$\frac{1}{2} \alpha \frac{\sin \phi}{\phi}$$

For a wedge of apex angle $\alpha$ to be 40 arc. sec. and for a rotation of the mechanical beam in counterclockwise direction by angle $\phi$ of 5 degrees, optical advantage is $$\frac{20 \text{ arc sec. } \sin 5°}{5°}$$

or $10^{-4}$ approx. Thus for a rotation of $\phi$ of the mechanical beam, we can generate an angle through which a line of sight can be deviated to be given by $10^{-4}$ times $\phi$.

Briefly stated, we can generate small angles accurately by using an optical wedge in conjunction with a mechanical beam. This technique has the advantage of being accurate and repeatable while being less costly.

Many modifications and variations of the present disclosed invention are possible in the light of the above teachings. As an example, an arrangement other than a mechanical beam can be used to cause tilting of the faces of the wedge. It is therefore understood that within the scope of the appended claims, the invention may be practiced otherwise than as specifically described.

What is claimed is:

1. A small angle generator which comprises:
 a rigid elongated mechanical beam having a first end and a second end;
 a flexure pivot connected to said first end of said mechanical beam;
 a rigid support adjacent said first end of said mechanical beam and said flexure pivot attached to said rigid support so as to enable said mechanical beam to rotate about a horizontal axis through said flexure pivot;
 means for rotating said mechanical beam about said horizonal axis;
 means for measuring rotational angle of said mechanical beam after rotation thereof;
 wedge means attached to said mechanical beam; and
 an autocollimator under test for generating a beam of light as a line of sight, said beam of light arranged to pass through said wedge means to cause a reduced angular deviation thereof having a linear relationship to the angular rotation of said mechanical beam whereby said deviation of said beam of light of said autocollimator under test is measured in terms of calibration of said beam of light using an auxiliary autocollimator.

2. The small angle generator of claim 1 which further includes means for accurately measuring the angle through which said mechanical beam is rotated.

3. The small angle generator of claim 2 wherein said means for accurately measuring the rotation angle of said mechanical beam includes a flat mirror rigidly attached to said mechanical beam experiencing same angular rotation as said mechanical beam.

4. The small angle generator of claim 2 wherein said means for rotating said mechanical beam include a micrometer mounted at the second end of said mechanical beam for rotation of said mechanical beam.

5. The small angle generator of claim 4 which further includes a support which cooperates with said micrometer to rotate said mechanical beam.

6. The small angle generator of claim 1 wherein said wedge means has a relatively small apex angle.

7. A method for generating small angles for calibrating an autocollimator using an elongate mechanical beam rotatably mounted on a support using a pivot at one end thereof and having a wedge means attached to said mechanical beam at the opposite end thereof, and a light beam of an autocollimator under test passing through said wedge means, said method including the steps of:
 rotating said mechanical beam;
 measuring the angle of rotation of said mechanical beam; and
 passing the optical beam from the autocollimator under test through said wedge means causing relatively small deviation in said light beam.

8. The method of claim 7 wherein the step of measuring rotation of said mechanical beam includes mounting said flat mirror on said mechanical beam and thus experiencing identical rotation to that of said mechanical beam, said flat mirror forming a part of an auxiliary autocollimator for calibration purposes.

* * * * *